United States Patent Office 3,191,571
Patented June 29, 1965

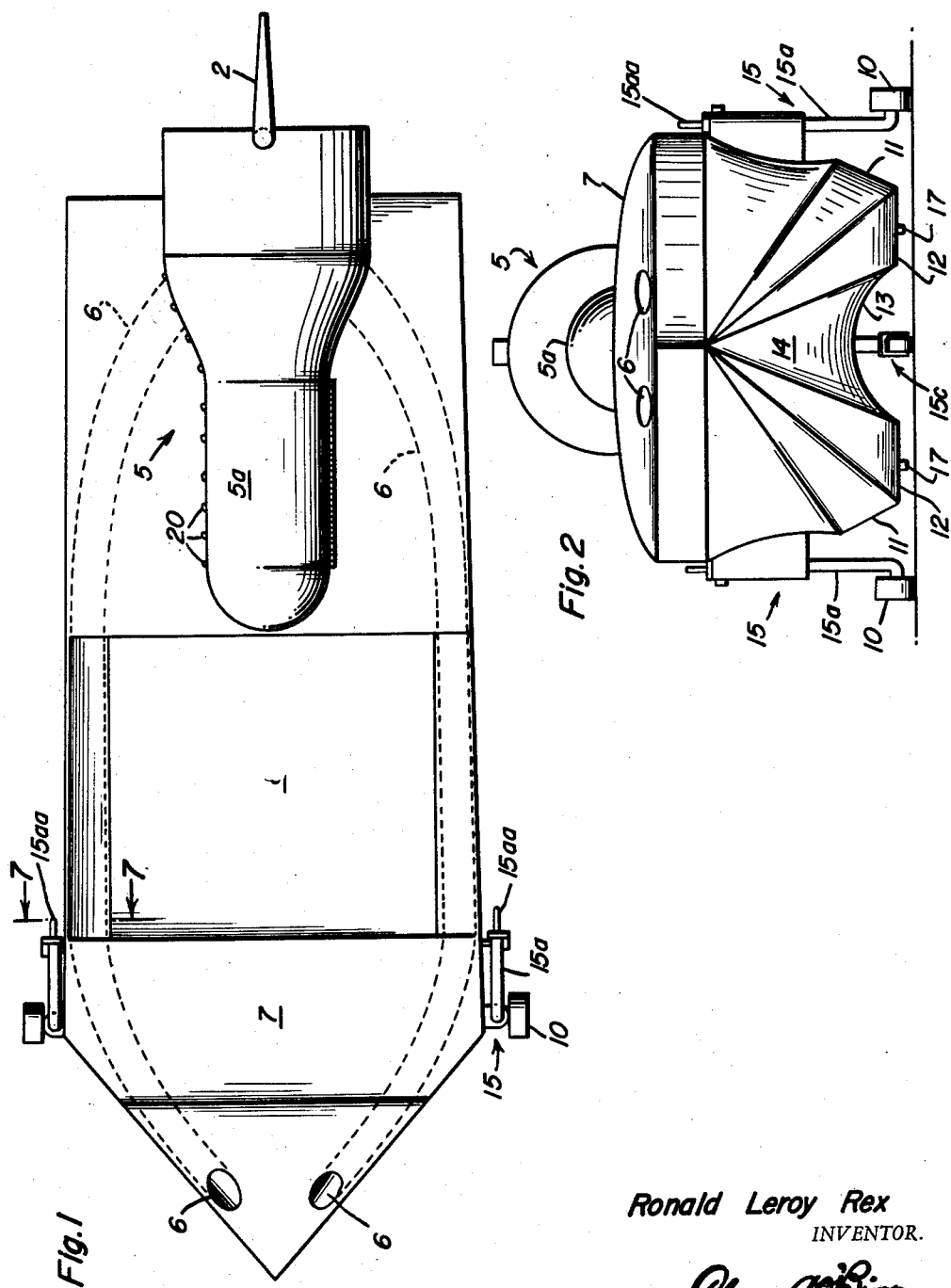

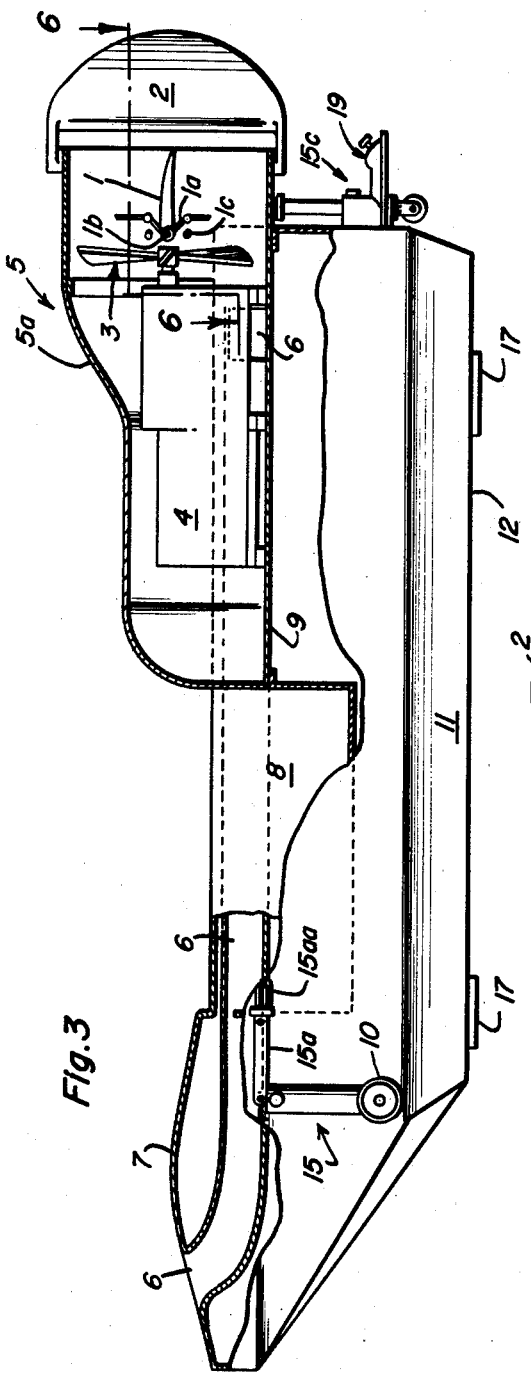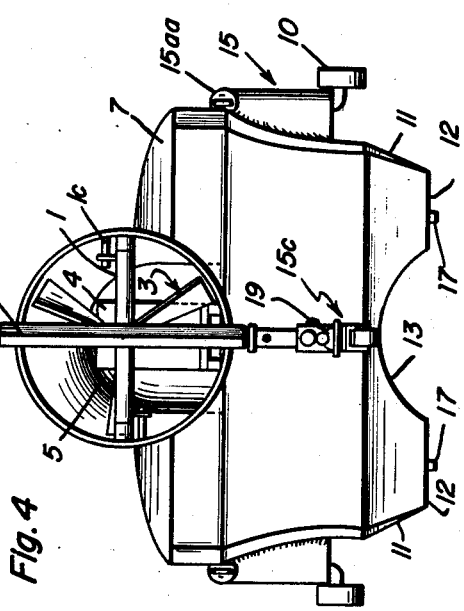

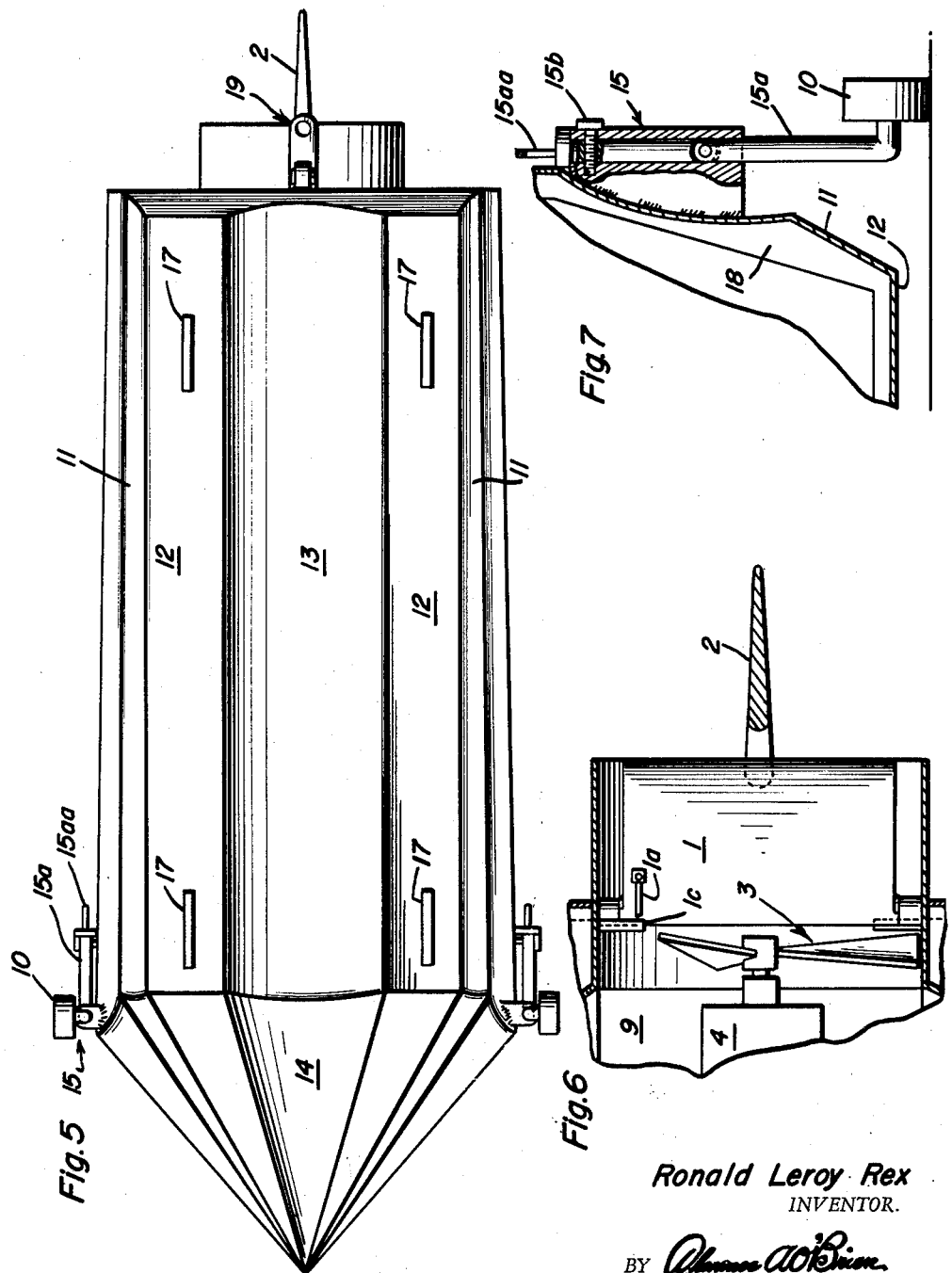

3,191,571
LAND, WATER, ICE AND SNOW BOAT
Ronald Leroy Rex, 423 Poplar St., Kane, Pa.
Filed June 27, 1962, Ser. No. 205,798
8 Claims. (Cl. 115—1)

The present invention generally relates to an air boat and more particularly such a boat which is capable of travelling on water, ice, snow and on land.

An object of the present invention is to provide an air boat or vehicle which is propelled by an air propeller driven by a suitable engine mounted upon a boat hull having particular characteristics including a particular shape for traversing water, ice runners for traversing ice, a particular shape for traversing snow and retractable and extensible wheel means for traversing land so that the boat may be transported as a trailer when certain of the wheels are lowered with the assembly including a trailer hitch for attaching to a suitable towing vehicle.

The boat construction of the present invention is simple for retaining the cost at a minimum and may be constructed in various size models with safety features incorporated therein that are not found in previously known air boats.

Still another object of the present invention is to provide an air boat incorporating an airfoil wing section in axial alignment with the air propeller to assist in supporting the engine weight and also to provide lift to the rear or nose of the boat depending upon orientation of the airfoil wing section. The airfoil wing section also may be employed to change the planing characteristics or attitude of the boat in either water or snow.

A further object of the present invention is to provide an air boat having a hull construction generally with an inverted V-shaped configuration and being provided with longitudinally extending transverse flat sections which are wide enough to enable the boat to ride on the flat section and not on the rest of the hull.

Still another feature of the present invention is the provision of a nacelle for the engine for safety purposes thus making it necessary to use intake tubes for the engine and propeller thereby eliminating an air blast across the entire surface of the boat with the air intake being at the forward end of the boat thereby eliminating a dangerous condition.

Still another important object of the present invention is to provide an air boat having a reversible pitch air propeller for use as a brake in snow, ice, land and water and for reverse and forward motion of the boat.

Still another important feature of the present invention is the provision of a hull having the wear surfaces thereof covered with stainless steel sheeting to protect against rust and to provide an extremely smooth and long lasting surface especially for engagement with snow.

Yet another important object of the present invention is to provide an air propeller enclosed in the nacelle to prevent any danger to the occupants with their being provided an engine access cover that is locked to prevent children or others from getting into contact with the blade.

Yet another important feature of the present invention is to provide an air boat having a hull with a prow or nose constructed in such a manner to allow easy maneuvering over rough terrain in snow or on ice. In the event of break through on thin ice, the boat will not tip over but will be maintained on an even keel and will be able to climb back on the ice with the use of the airfoil wing section if necessary.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the air boat;

FIGURE 2 is a front end view of the boat illustrating the construction of the nose or prow together with the wheels in their extended position;

FIGURE 3 is a side elevational view of the boat with portions thereof broken away illustrating the component parts thereof and their relationship to each other;

FIGURE 4 is a rear end view illustrating the wheels in their extended position, the trailer hitch and rear configuration of the boat;

FIGURE 5 is a bottom plan view with the wheels retracted;

FIGURE 6 is a sectional view taken along section line 6—6 of FIGURE 3 illustrating the airfoil and rudder; and FIGURE 7 is a sectional view along section line 7—7 of FIGURE 1 illustrating the structure of one of the nose wheels in extended position.

Initially, it is pointed out that the air boat of the present invention may be propelled with any suitable engine 4, such as an air cooled aircraft engine or a conventional water cooled automotive engine whichever is most desirable from the standpoint of the individual and from the standpoint of total cost. It is desirable that the engine 4 has a maximum speed of at least 4,000 r.p.m. for driving a three or four bladed propeller 3 in order to obtain the maximum usage of the airfoil wing section 1 disposed behind and in axial alignment with the propeller 3. The airfoil wing section is mounted as illustrated in FIGURE 6 by virtue of a control cable horn 1A that will be movable by the boat operator but which will have stops 1C for a limited amount of travel in order to avoid the danger of too much up or down motion. The pivot rod 1B through the airfoil wing section 1 will keep the front of the airfoil wing section 1 in a stabilized position and be connected to the sides of the nacelle 5 for pivotal movement about a substantially transverse axis.

When and if the boat breaks through the ice, the airfoil wing section 1 may be used in a lowered position to attain the needed lift to raise the rear of the boat up and on to the ice as the nose or prow of the boat hull is constructed in such a manner as to ride up on the ice. This, is necessary, only if maximum horsepower of the engine will not raise the boat onto the ice when the airfoil wing section 1 is in normal horizontal position.

Also, the airfoil wing section 1 is used for the function of bringing the rear of the boat up out of the water when the nose is on the land and to keep the weight from exerting too much pressure on the rear of the boat. Thus, the airfoil wing section facilitates movement of the boat from the water after the wheels 10 have been lowered thus enabling the boat to even climb a relatively steep bank on a body of water.

The airfoil wing section 1 in conjunction with the rudder 2 is also a necessity and the maneuvering of the boat on snow for quick or sharp turns and also for the same purpose in water. Also, in snow the airfoil wing section 1 may be employed to tilt the boat enough to allow for easy turns thus further facilitating the handling characteristics of the boat.

The engine 4 is provided with elongated air intake tube sections 6 which is a necessity in view of the nacelle 5 because the engine 4 is shielded along with the propeller 3. The intake tube 6 will allow sufficient air to be drawn into the nacelle 5 for the engine needs and for the thrust on the boat by the propeller. The nacelle 5 is incorporated for the main purpose of protection for the occupant and in the event of contact with other craft in water, the blade or propeller 3 will not be in position to damage the other craft or endanger life. When in snow, even if a brush or tree limb is encountered, the object will not become entangled in the propeller or blade 3 thereby eliminating this cause of damage to the blade 3 or to the engine and also eliminate any possible personal injury to the occupant from this cause.

In view of the air intake tubes which must be relatively large, the deck 7 of the boat hull is transversely arched at least at the forward end thereof and as illustrated in FIGURES 1-4, the deck section 7 may also be longitudinally arched. This construction orientates the intake end of the tube 6 above the water level to keep the intake of water to a minimum.

The hull construction itself includes an inverted U-bottom 13 as illustrated in FIGURE 5 with the surfaces defining the inverted U-bottom being flat and inclined in relation to each other. At the forward end of the inverted U-bottom, there is an inclined hollow section 14 thus enabling the water to, in effect, go under the hull rather than being spread apart in a wedge-shape as in a conventional craft. When traversing snow, this hollow section defined by the forward section 14 and the inverted U-shaped bottom 13 will form a ridge or path which will keep the boat on top of the snow and force the boat to cut a wedge in the snow as a conventional craft would do. Extending transversely outwardly in a flat condition in relation to the inclined surfaces which form the inverted U-bottom 13 are flat surfaces 12 which may be considered the main hull section to be in engagement with the snow and these flat sections have the ice runners 17 fastened thereon in any suitable manner. Also, the horizontal flat surfaces 12 are an important feature in the water as the speed of the boat reaches a minimum speed of five to ten miles per hour, the horizontal flat surfaces 12 will plane on the water and will be utilized with hollow sections 13 and 14 to allow the boat to run over the water and not push water forward or permit the hull to wedge into the water. The inclined surfaces 11 which are disposed outwardly of the flat surfaces 12 are employed to stabilize the boat when passing over water and to more effectively enable the boat to turn. Also, when traversing snow, the inclined surface 11 tends to push snow away from the boat and act as bumpers or slide surfaces in the event the boat comes in contact with rocks, brush and other objects of this nature thus preventing damage to the boat.

The ice runners 17 do not interfere with either the operation of the boat on water or snow since they are relatively short and project only a very small distance from the flat surface 12. The hull is constructed of sheet metal, plywood or any other suitable lightweight material capable of use in water and the boat hull regardless of the material from which it is made will be reinforced by strips or ribs of heavier material such as heavy gauge sheet metal strips, wood rigs 18 for reinforcements and the like. The interior construction of the hull may vary and follow sound hull construction practices. Also, certain of the surfaces of the hull whether it be made of sheet metal, plywood or the like have a stainless steel sheeting covering the hull. The stainless steel sheeting will be secured to the hull in any suitable manner such as welding to the sheet metal and will extend up to the nose and cover the surfaces which normally engage the snow or water including surfaces 11, 12, 13 and 14. This enables the ice runner 17 to be brased onto the flats and the ice runner 17 may also be of stainless steel and beveled at each end.

Adjacent the front of the hull, there are two front wheels 10 carried by a folding front wheel shaft 15A and a pin 15B is provided for retaining the shaft 15A in a lowered position by pinning the shaft 15A to the shaft housing 15. When the boat is in water, the pin 15B is removed and the shaft 15A is raised by handle 15AA and folded at the joint and laid against the hull. The housing 15 is welded to the hull and aligned at construction. The rear or tail wheel 15C is also of a broken construction and is welded to the hull or otherwise secured thereto. The rear wheel 15C is swivelled to allow for turning on the ground. When the boat is hauled by the trailer hitch 19, the tail wheel 15C is in a raised position while the two front wheels are in a downwardly extended position.

The nacelle 5 is provided with a supporting plate 9 and the nacelle is preferably formed of sheet metal and is of a ribbed supported structure with a hinged door 5a having lock down screws 20 for retaining the door in place. There is a large opening at the propeller which along with the intake tube 6 serves as air passage means and the nacelle is a support for the airfoil wing section 1 and the rudder 2 as is the engine housing. The nacelle is a safety feature of the boat as a propeller covering and is used in conjunction with the intake tubes for engine intake and, in reverse pitch for engine outlet and the air will enter or exit at the highest point of the arched deck 7.

The details of the reversible pitch propeller, the mounting and controls for the rudder and airfoil wing section as well as the controls for the engine, occupant seats in the passenger compartment 8 and other control mechanisms are not illustrated since any conventional controls and occupant facilities may be provided. This is also true of the internal construction of the boat hull and the particular manner of attaching the various components in an assembled relation. The essence of the present invention is the orientation of the components and the association thereof for producing the novel results.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A boat hull for use in a convertible land, water, ice and snow vehicle comprising an elongated bottom and an upwardly inclined prow contiguous therewith, side wall portions connected with the bottom and a stern portion connected with the bottom and side wall portions to form a hull, said bottom and prow having a continuous inverted U-shaped, central hollow area extending throughout the length thereof with the section of the inverted U-shaped hollow area extending through the prow converging towards the upper end thereof, a pair of longitudinally disposed transverse flat sections disposed horizontally outwardly of the inverted U-shaped portion, said flat sections extending upwardly into the prow and reducing in transverse dimension to the upper end thereof, an upwardly and outwardly inclined section extending continuously longitudinally and laterally outwardly of the flat sections with the outer edge thereof joined with the side wall portions, said upwardly inclined sections converging in transverse dimensions from the forward end of the bottom to the upper end of the prow for enabling the hull to traverse water with less drag and enabling water to pass through the inverted U-shaped section without wedging out the water.

2. The boat hull assembly as defined in claim 1 wherein each of said flat sections of the bottom is provided with a plurality of longitudinal runners, the runners on each section being longitudinally spaced, aligned and extending a relatively small portion of the length of the flat sections and extending a very small distance downwardly therefrom for engagement with ice to enable the hull to be propelled over an ice surface.

3. The structure as defined in claim 2 wherein said boat hull includes a pair of retractible front wheels, and a single retractible rear wheel for enabling the hull to traverse land surfaces, said rear wheel having a trailer hitch thereon to enable the hull to be towed behind a towing vehicle with the rear wheel elevated and the hitch attached to the towing vehicle whereby the two front wheels act as support wheels for the hull when being towed.

4. The structure as defined in claim 1 wherein said boat hull includes an engine mounted thereon, an air propeller driven by said engine, an airfoil wing section disposed horizontally behind and in axial alignment with the propeller for enabling adjustment in the vertical attitude of the rear of the boat to enable the boat to climb upon an ice surface from a water surface, climb upon to a land surface from a water surface and to facilitate control and stability when traversing snow or water.

5. The structure as defined in claim 4 together with a rudder mounted in axial alignment with and vertically behind the propeller for controlling the direction of motion of the hull.

6. The structure as defined in claim 5 wherein an enclosing nacelle is mounted around the engine and propeller to prevent persons occupying the hull from coming into contact with either the engine or propeller, and air intake tubes extending forwardly of the hull and opening to the front end thereof for enabling intake of air for the engine and propeller to eliminate excessive air velocities passing over the occupants of the boat hull.

7. The structure as defined in claim 6 wherein the forward portion of said hull is provided with an arched deck for enabling the open ends of the air intake tubes to be disposed above the water line to eliminate intake of water.

8. The structure as defined in claim 1 wherein said hull is provided with a sheet metal covering on the external surfaces thereof which engage the supporting ice, snow or water.

References Cited by the Examiner

UNITED STATES PATENTS

| | | | |
|---|---|---|---|
| D. 192,949 | 5/62 | Montfort. | |
| 652,876 | 7/00 | Andrade | 114—665 |
| 1,296,775 | 3/19 | Dalton | 244—123 |
| 1,355,611 | 10/20 | Macleod | 244—123 |
| 1,792,031 | 2/31 | Price | 115—15 |
| 2,165,633 | 7/39 | Hunt | 114—43 |
| 2,207,042 | 7/40 | Waseige | 170—135 |
| 2,216,416 | 10/40 | Mader | 170—135 |
| 2,503,973 | 4/50 | Smith | 244—53 |
| 2,637,050 | 5/53 | Oliver | 9—1 |
| 2,673,991 | 4/54 | Dahlkvist | 9—1 |
| 2,695,584 | 11/54 | Watters | 114—43 |
| 2,855,885 | 10/58 | Thomas | 114—43 |
| 3,033,494 | 5/62 | Tyler et al. | 244—54 |
| 3,051,115 | 8/62 | Canazzi | 114—56 |
| 3,063,661 | 11/62 | Smith | 244—54 |

OTHER REFERENCES

Daniels, G.: "Steam Torpedo Boat," in Mechanix Illustrated, pages 46–51, December 1942.

MILTON BUCHLER, *Primary Examiner.*

ANDREW H. FARRELL, *Examiner.*